UNITED STATES PATENT OFFICE.

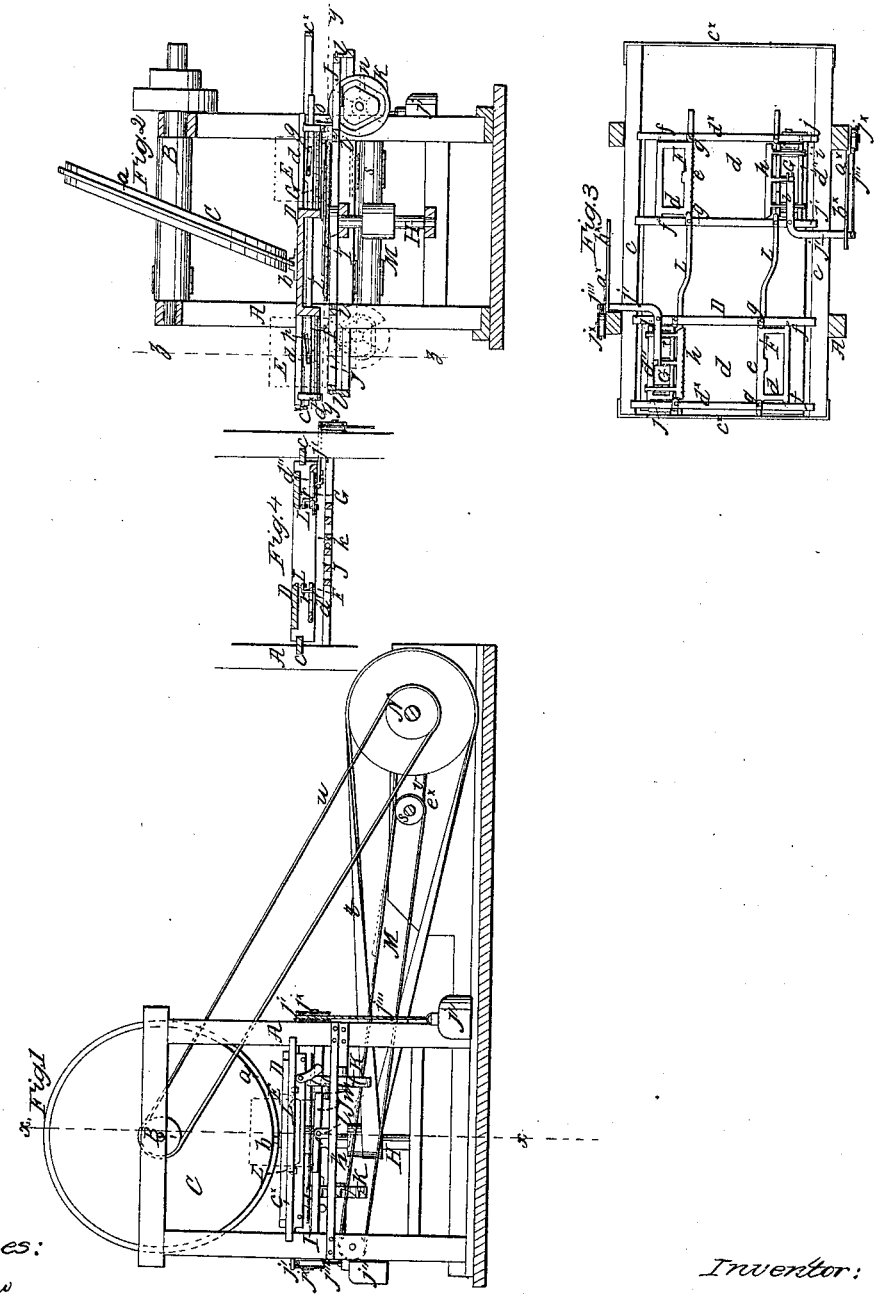

NATHANIEL WATERBURY, OF FOND DU LAC, WISCONSIN.

SHINGLE-MACHINE.

Specification of Letters Patent No. 25,293, dated August 30, 1859.

*To all whom it may concern:*

Be it known that I, NATHANIEL WATERBURY, of Fond du Lac, in the county of Fond du Lac and State of Wisconsin, have invented a new and Improved Shingle-Machine; and I do hereby declare that the following is a full, clear, and exact description of the same, reference being had to the annexed drawings, making a part of this specification, in which—

Figure 1, is a side view of my invention. Fig. 2, is a vertical section of the same, taken in the line $x$, $x$, Fig. 1. Fig. 3, is a horizontal section of the same, taken in the line $y$, $y$, Fig. 2, and looking upward. Fig. 4, is a vertical section of the same, taken in the line $z$, $z$, Fig. 2.

Similar letters of reference indicate corresponding parts in the several figures.

This invention relates to an improvement in that class of shingle machines in which a circular saw is used for sawing the shingles from the bolts and tilting beds employed for adjusting the bolts relatively with the saw, so that the latter may cut the shingles from the bolts in taper form.

The invention consists in the employment or use of a reciprocating bolt carriage in connection with sliding jaws, arranged relatively with a circular saw, and tilting beds and operated substantially as hereinafter shown and described, whereby the bolts are properly adjusted and fed automatically to the saw.

The invention also consists in the employment or use of a bolt-elevating device placed in the reciprocating bolt-carriage and arranged substantially as hereinafter described to elevate the bolts during their return movement over the saw.

To enable those skilled in the art to fully understand and construct my invention I will proceed to describe it.

A, represents a rectangular framing, in the upper part of which a horizontal shaft B, is placed, said shaft having an oblique oval-shaped cam C, placed on it, the periphery of the cam being provided with a flanch $a$, which works in a notched plate $b$, on the upper surface of a reciprocating bolt-carriage D, and as it rotates gives said carriage its reciprocating movement. This will be clearly understood by referring to Fig. 2. The bolt-carriage D, is simply a horizontal platform attached to suitable timbers and fitted between proper guides $c$, in the framing A, and allowed to work freely between them. At each end of the carriage D, a rectangular recess $d$, is made to allow a bolt E, shown in red, to pass through and be clutched by the jaws F, F, G, G, which are attached to the bolt-carriage D, below the platform and at each side of the recess $d$, as shown clearly in Fig. 3. The jaws F, F, are formed each of a rectangular metal frame $d'$, the front edges of the frames being serrated as shown at $e$, and the back parts hung in the bolt carriage as shown at $f$, to admit of the front parts $e$, being raised and lowered from $f$, as centers. Stops $g$, are attached to the carriage to prevent the front parts $e$, of the jaws F, from descending below a proper point, see Fig. 3. The jaws F, are stationary with the exception of the adjustable raising and lowering movement just described. The jaws G, however have two movements, to wit, the raising and lowering one as the jaws F, and also a horizontal sliding movement. To effect this the jaws G, are formed each of a serrated bar $h$, provided with slides $i$, $i$, which are fitted and work transversely in a frame $d''$, the back or outer parts of which are hung to the bolt carriage D, as shown at $j$, and has the same movement as the frame $d'$, see Fig. 3. Each bar $h$, of the jaws G, has a bent lever $j'$, connected to it and a weight $j''$, is attached to each lever $j'$, by a cord $j'''$, which passes over a pulley $j^*$.

In the framing A, below the bolt carriage D, a vertical shaft H, is placed. On the upper end of this shaft a circular saw I, is secured, said saw being just below the carriage, as shown in Figs. 1 and 2. At each side of the framing A, a bed J, is placed. These beds may be of metal and pivoted at their centers, as shown at $k$, between bars or supports $l$, $l$, attached to each side of the framing. To one side of each bed J, a pin $m$, is attached, and the outer ends of these pins fit in grooves $n$, made in the sides of the ratchets K, K, placed in the framing A, one by the side of each bed. The form of the grooves $n$, is plainly shown in Fig. 2.

To the bolt carriage D, and near each end of it a pendant $o$, is pivoted loosely, and in the bolt carriage two longitudinal slide bars L, L, are placed and allowed to slide freely in a longitudinal direction.

The bars L, L, have each two inclined slots $p$, $q$, made horizontally through them in reverse positions, as shown plainly in